US008531736B2

(12) United States Patent
Matsunaga

(10) Patent No.: US 8,531,736 B2
(45) Date of Patent: Sep. 10, 2013

(54) IMAGE PROCESSING APPARATUS AND IMAGE PROCESSING METHOD

(75) Inventor: Daisuke Matsunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 12/561,954

(22) Filed: Sep. 17, 2009

(65) Prior Publication Data

US 2010/0073732 A1    Mar. 25, 2010

(30) Foreign Application Priority Data

Sep. 22, 2008 (JP) ................................. 2008-242568

(51) Int. Cl.
*H04N 1/40* (2006.01)
(52) U.S. Cl.
USPC ........... 358/447; 358/448; 358/465; 382/276; 399/67
(58) Field of Classification Search
USPC ............ 358/447, 448, 465; 382/276; 399/67
See application file for complete search history.

(56) References Cited

U.S. PATENT DOCUMENTS

| 2003/0081177 A1* | 5/2003 | Rosen .............................. 352/38 |
| 2005/0152619 A1* | 7/2005 | Motomura et al. ........... 382/299 |
| 2006/0018653 A1* | 1/2006 | Kido .............................. 396/310 |
| 2006/0104540 A1* | 5/2006 | Haussecker et al. .......... 382/276 |
| 2009/0196641 A1* | 8/2009 | Banton et al. ................... 399/67 |

FOREIGN PATENT DOCUMENTS

JP        11-136505 A      5/1999

OTHER PUBLICATIONS

"Super-resolution processing by Plural Frames of Digital Image Data" (Ricoh Technical Report No. 24, Nov., 1998).

* cited by examiner

*Primary Examiner* — Twyler Haskins
*Assistant Examiner* — Michael Burleson
(74) *Attorney, Agent, or Firm* — Canon USA Inc. IP Division

(57) ABSTRACT

An image processing apparatus includes a high-resolution converting unit configured to use image data of a plurality of frames of images in which positions read by a sensor are shifted by less than one pixel in a main scanning direction and/or a sub-scanning direction to generate image data having resolution higher than resolution of the sensor, an image region information generating unit configured to generate image region information corresponding to the image data read by the sensor, and an image region information high-resolution converting unit configured to convert a format of the image region information generated by the image region information generating unit and to perform a high-resolution conversion on the image region information using the high-resolution converting unit in such a way as to cause the image region information to correspond to the image data having the resolution higher than the resolution of the sensor.

5 Claims, 20 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method that can execute a copying or transmitting process using a scanner.

2. Description of the Related Art

In an image processing apparatus, such as a multifunction peripheral (MFP), there exists a technique of generating "image region information" corresponding to each pixel of an input image and performing appropriate image processing on the input image for every region (for example, refer to Japanese Patent Application Laid-Open No. 11-136505).

The "image region information" includes information, such as information of a text region, information of a halftone region or information of a text-in-halftone region.

In addition, a method for generating image region information from an input image is discussed in Japanese Patent Application Laid-Open No. 11-136505.

Further, when the image region information of the image is determined using the technique, a pixel pattern of a predetermined region that is needed to determine the image region information is used. Therefore, a buffer is provided to hold pixels of the predetermined region.

In addition, a buffer that holds a pixel pattern to perform a determination, such as a halftone determination, also needs to be provided.

On the other hand, there is an image processing technique using a transparent toner to show glossiness for an output image on a surface of paper.

Since the transparent toner does not have colors distinguished by a reading ability of a scanner, a general scanner cannot detect glossiness information indicating that an image portion using the transparent toner has luster, when an image is read.

Accordingly, the image region information including the glossiness information cannot be generated from an image input by the scanner.

Thus, in order to acquire the image region information from the image using the transparent toner, the image region information needs to be acquired using a special scanner or detecting device (for example, refer to Japanese Patent Application Laid-Open Nos. 05-333450 and 09-222361).

Further, there is a technique called "super-resolution processing" that acquires one frame of high-resolution image using a plurality of frames of images having constant resolution.

By using this technique, an image having a resolution of 1200 dpi can be generated using an image having a resolution of 600 dpi, and a high-resolution image can be obtained without greatly changing the configuration of an image processing apparatus according to the conventional art ("Super-resolution processing by Plural Frames of Digital Image Data" (Ricoh Technical Report No. 24, November, 1998)).

Image region information is generated from an image converted to have a high resolution and is used for the image converted to have a high resolution, thereby performing proper image processing.

However, if the resolution of the input image data is increased, the number of pixels needed to perform an image region determination in a predetermined region is increased.

For this reason, in order to perform a proper image region determination for the image data converted to have a high resolution, if image region information is generated from the high-resolution image data, a large buffer needs to be provided. As a result, a circuit scale may be increased.

As described above, when the image using the transparent toner is read by the reading device such as a scanner, the glossiness information of the image needs to be acquired using a special scanner or detecting device.

However, the glossiness information can be acquired only when the image is read by the scanner.

That is, when the glossiness information is included in the read image, the image including the glossiness information is converted into image data having a high resolution, and glossiness information corresponding to the high-resolution image data cannot be generated from the image data.

SUMMARY OF THE INVENTION

According to an aspect of the present invention, an image processing apparatus that has a reading sensor configured to read an original image includes an image data acquiring unit configured to acquire image data of a plurality of frames of images in which positions read by the reading sensor are shifted by less than one pixel in a main scanning direction and/or a sub-scanning direction; a high-resolution converting unit configured to perform interpolation by using the plurality of frames of image data acquired by the image data acquiring unit to obtain image data having resolution higher than resolution of the reading sensor; an image region information generating unit configured to generate image region information including image region bits from the image data acquired by the reading sensor; an image region information converting unit configured to convert the image region information generated by the image region information generating unit into a format capable of being input to the high-resolution converting unit; an image region information high-resolution converting unit configured to perform a high-resolution conversion on the image region information whose format has been converted by the image region information converting unit, by using the high-resolution converting unit; and an image region information regenerating unit configured to regenerate the image region information, which has been converted to have the high resolution by the image region information high-resolution converting unit, as image region information having the same resolution as that of the image data converted to have the high resolution by the high-resolution converting unit.

According to another aspect of the present invention, an image processing apparatus that has a reading sensor configured to read an original image includes an image data acquiring unit configured to acquire image data of a plurality of frames of images in which positions read by the reading sensors are shifted by less than one pixel in a main scanning direction and/or a sub-scanning direction; a high-resolution converting unit configured to perform interpolation by using the plurality of frames of image data acquired by the image data acquiring unit to obtain image data having resolution higher than resolution of the reading sensor; a special toner information acquiring unit configured to have a unit that acquires information about a special toner added to the image data of the read original image; a special toner information converting unit configured to convert the special toner information into a format capable of being input to the high-resolution converting unit; a special toner information high-resolution converting unit configured to perform a high-resolution conversion on the special toner information whose format has been converted by the special toner information converting unit, by using the high-resolution converting unit; and a special toner information regenerating unit configured to regenerate the special toner information, which has been converted to have the high resolution by the special toner information high-resolution converting unit, as special toner information having the same resolution as that of the image data converted to have the high resolution by the high-resolution converting unit.

According to an exemplary embodiment of the present invention, image region information suitable for a high-resolution image after super-resolution processing can be acquired by using image region information obtained from an image having the same resolution as that of a reading sensor and an existing super-resolution processing circuit. For this reason, a plurality of circuits generating image region information may not be configured to correspond to a variety of resolution. Accordingly, the circuit scale can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In an exemplary embodiment of the present invention, a plurality of images whose phases are shifted are obtained using a multifunction peripheral (MFP) as an image processing apparatus, and high-resolution images are generated.

Figure 1:
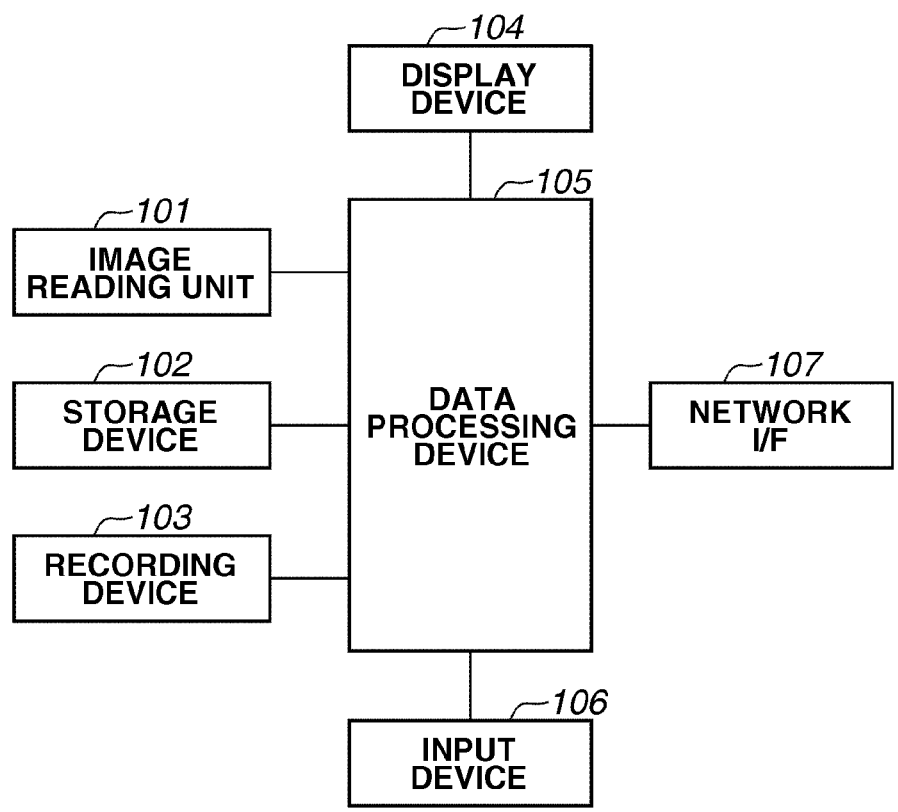
FIG. 1 illustrates a configuration of an MFP according to an exemplary embodiment of the present invention.

FIG. 1 illustrates a configuration of an MFP. An image reading unit 101 is a scanner including an auto document feeder. In the image reading unit 101, a light source (not illustrated) irradiates a batch of original images or an original image, an image reflected from the original image is formed by a lens on a solid-state image sensor, such as a charge-coupled device (CCD) sensor, so that raster image read signals from the solid-state image sensor are obtained as image information. In an MFP including a color scanner, RGB color images are obtained with three types of color filters attached to a solid-state image sensor.

A recording device 103 is a printer. When a copy function of the MFP is executed, image signals are processed into recording signals by a data processing device 105, and the recording signals are sequentially output to the recording device 103, whereby an image is formed on paper. At this time, the data processing device 105 performs image processing, such as gamma processing, color space conversion processing, image region processing, filter processing, compression processing, halftone processing, and block division processing on data received from the image reading unit 101. The recording device 103 performs image forming on the data processed by the data processing device 105 and outputs the image.

Instructions from an operator to the MFP are provided through an input device 106, which is a key operation unit provided in the MFP. Those series of operations are controlled by a control unit (not illustrated) in the data processing device 105.

On the other hand, an operation input status and image data that is being processed are displayed in a display device 104. A storage device 102 is a storage area, such as a synchronous dynamic random access memory (SDRAM) or a hard disk drive (HDD), which is capable of storing image data and the like read by the image reading unit 101.

A network I/F 107 is an interface to connect to a network. By using the network I/F 107, image data can be received from a personal computer (PC) or the like, the image data can be processed by the data processing device 105, and the image data can be printed by the recording device 103. In addition, data read by the image reading unit 101 and processed by the data processing device 105 can be transmitted to a PC or the like via the network I/F 107.

Next, a super-resolution processing technique will be described.

Figure 16A:
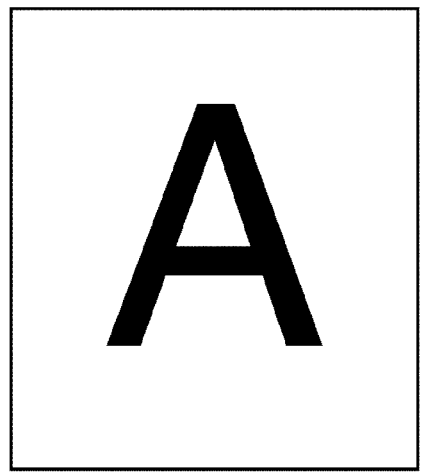
FIGS. 16A to 16C illustrate super-resolution processing.
Figure 16B:
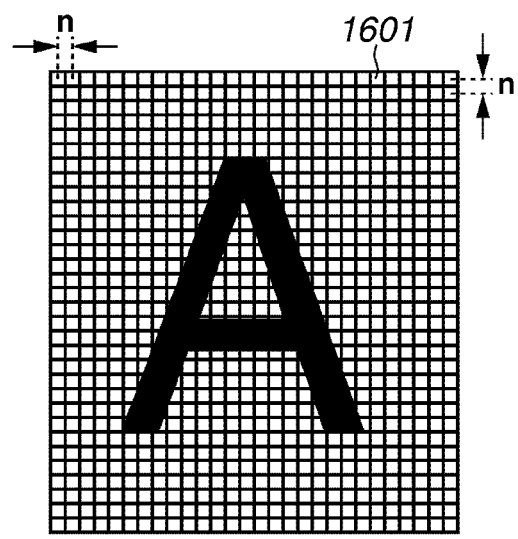

FIG. 16A illustrates an image to be read by a reading device. FIG. 16B illustrates a pixel configuration when the image is read at resolution of 1200 dpi, for example.

In FIG. 16B, a grid pattern 1601 indicates pixel data constituted at reading resolution.

That is, a distance n as a pixel pitch corresponds to a distance of a pixel sensor when the reading resolution is 1200 dpi.

Figure 16C:
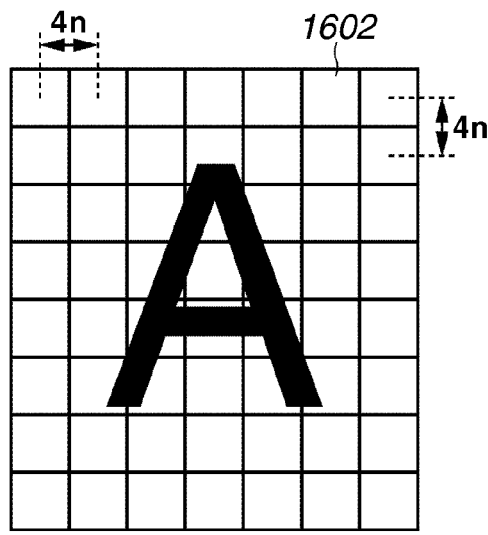

FIG. 16C illustrates a pixel configuration when the reading device reads an image of the same image size at resolution of 300 dpi.

As in FIG. 16B, a grid pattern 1602 indicates pixel data constituted at reading resolution.

Thus, compared to the distance n as a pixel pitch in 1200 dpi, the distance as a pixel pitch when the reading resolution is 300 dpi is longer, that is, 4n.

Since the reproducibility of a read image is proportional to the resolution, a difference in image quality is significant between the image read at 1200 dpi (FIG. 16B) and the image read at 300 dpi (FIG. 16C).

Super-resolution processing is a technique of generating the image illustrated in FIG. 16B from a plurality of frames of images each corresponding to the image illustrated in FIG. 16C.

By using this technique, an image equivalent to that read by a high-resolution device can be generated even if the resolution of a reading device is not so high.

However, certain conditions need to be satisfied to perform "super-resolution conversion" for obtaining a high-resolution image or a higher-resolution image from a low-resolution image.

The conditions are as follows. A plurality of sequential frames of image data where the reading positions as the positions of the original read by the sensors are slightly shifted in a main scanning direction and a sub-scanning direction are necessary.

In other words, a plurality of sequential frames of image data are necessary, the sequential frames being generated by slightly shifting the reading position on the original.

In addition, among the plurality of sequential frames of low-resolution image data, between the adjacent image data, a shift in reading position on the original image by the sensors needs to be smaller than one pixel (sub-pixel).

Hereinafter, the position of a pixel read in an original image is called a "phase".

When the phase shifts, it is called "the phase shifts", and a shift of a read pixel is called a "phase shift".

The low resolution used here is not limited to 300 dpi but means the resolution of an image output from the device in normal printing.

Of course, conversion to higher resolution can be performed based on a phase shift only in the main scanning direction or a phase shift only in the sub-scanning direction. In this case, however, higher resolution is achieved only in the direction having a phase shift.

Hereinafter, a description is given about the necessary conditions for the super-resolution processing with reference to FIGS. 17A to 17F.

Figure 17A:
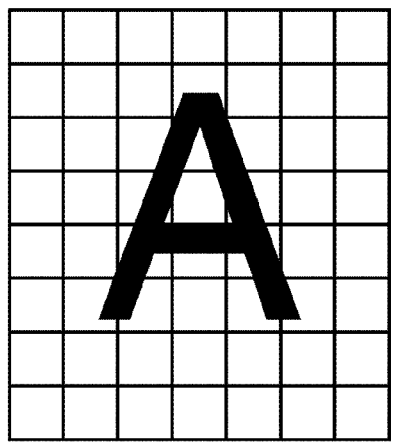
FIGS. 17A to 17F illustrate super-resolution processing.
Figure 17B:
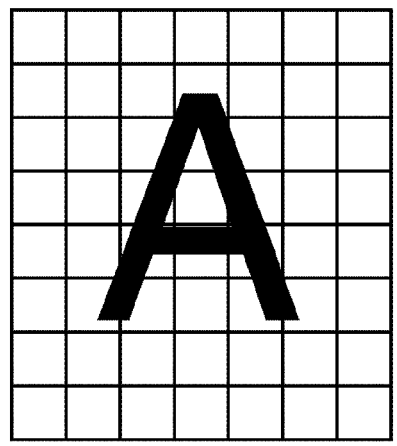

FIG. 17A illustrates a pixel configuration when the original image illustrated in FIG. 16A is read at resolution of 300 dpi, which is similar to the original image diagram of FIG. 16A. A read image illustrated in FIG. 17B serves as a first-frame target image on which super-resolution processing is to be performed and servers as a reference image.

Figure 17C:
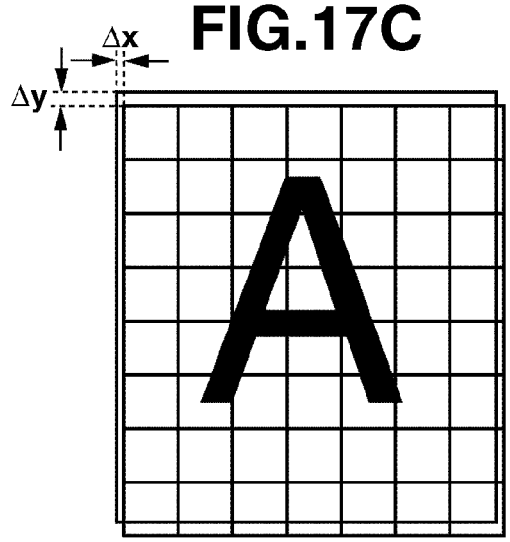

Then, as illustrated in FIG. 17C, the original image illustrated in FIG. 16A is read at resolution of 300 dpi with a phase shift of $\Delta x$ ($\Delta x < 4n$) in the main scanning direction and $\Delta y$ ($\Delta y < 4n$) in the sub-scanning direction based on the original image.

Figure 17D:
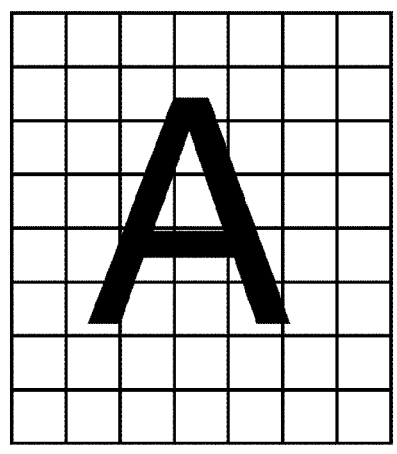

In this case, the phase of a read image illustrated in FIG. 17D is different from that of the original image, and the phase is shifted by $\Delta x$ to the left in the main scanning direction and $\Delta y$ upward in the sub-scanning direction in the figure.

The read image illustrated in FIG. 17D serves as a second-frame target image on which super-resolution processing is to be performed.

Figure 17E:
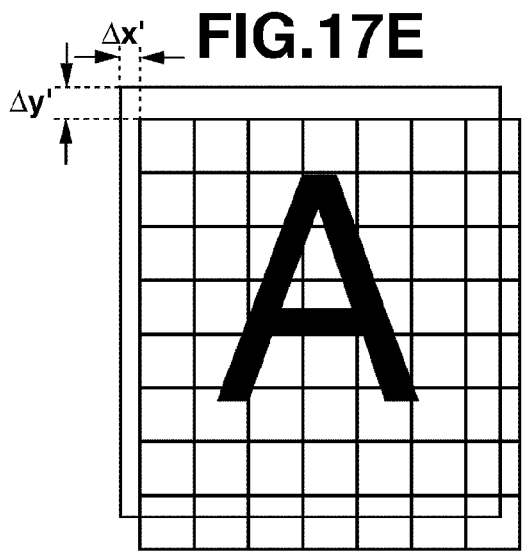

Furthermore, as illustrated in FIG. 17E, the original image illustrated in FIG. 16A is read at resolution of 300 dpi with a phase shift of $\Delta x'$ ($\Delta x' < 4n$, $\Delta x < \Delta x'$) in the main scanning direction and $\Delta y'$ ($\Delta y' < 4n$, $\Delta y < \Delta y'$) in the sub-scanning direction based on the original image.

Figure 17F:
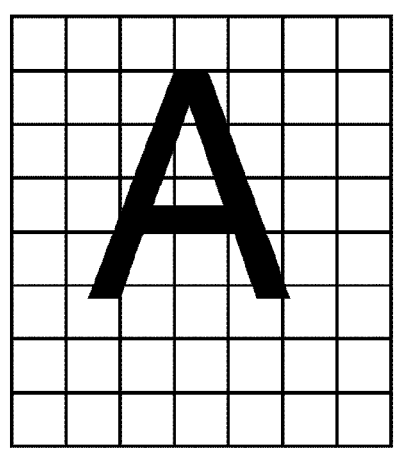

In this case, the phase of a read image illustrated in FIG. 17F is different from that of the original image, and the phase is shifted by $\Delta x'$ to the left in the main scanning direction and $\Delta y'$ upward in the sub-scanning direction in the figure.

The read image illustrated in FIG. 17F serves as a third-frame target image on which super-resolution processing is to be performed.

After such a plurality of frames of low-resolution image data having different phases to the reference image have been obtained, conversion to higher resolution can be performed through super-resolution processing.

FIGS. 18A to 18D illustrate a concept of generating a high-resolution image from three frames of low-resolution images.

Figure 18A:
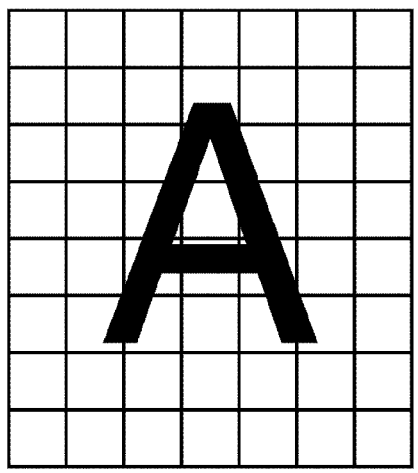
FIGS. 18A to 18D illustrate super-resolution processing.
Figure 18B:
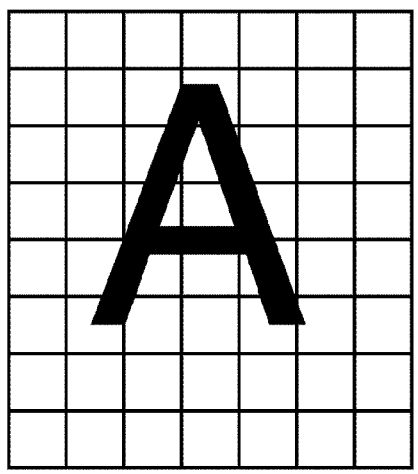
Figure 18D:
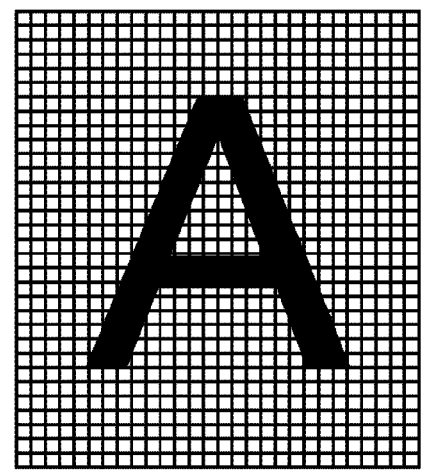
Figure 18C:
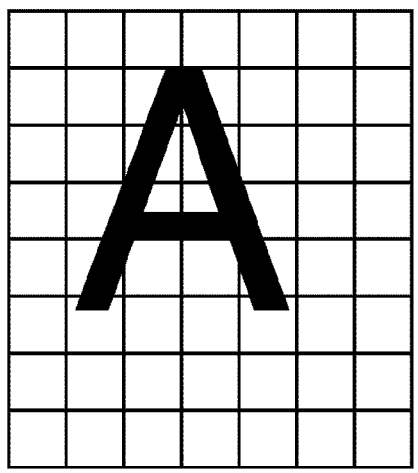

The figure shows that an image of FIG. 18D can be obtained by performing super-resolution processing on a plurality of frames of low-resolution images having different phases from phases of the reference images illustrated in FIGS. 18A, 18B, 18C and so on.

The super-resolution processing performed at this time will be described in detail with reference to FIGS. 19 and 20.

Figure 19:
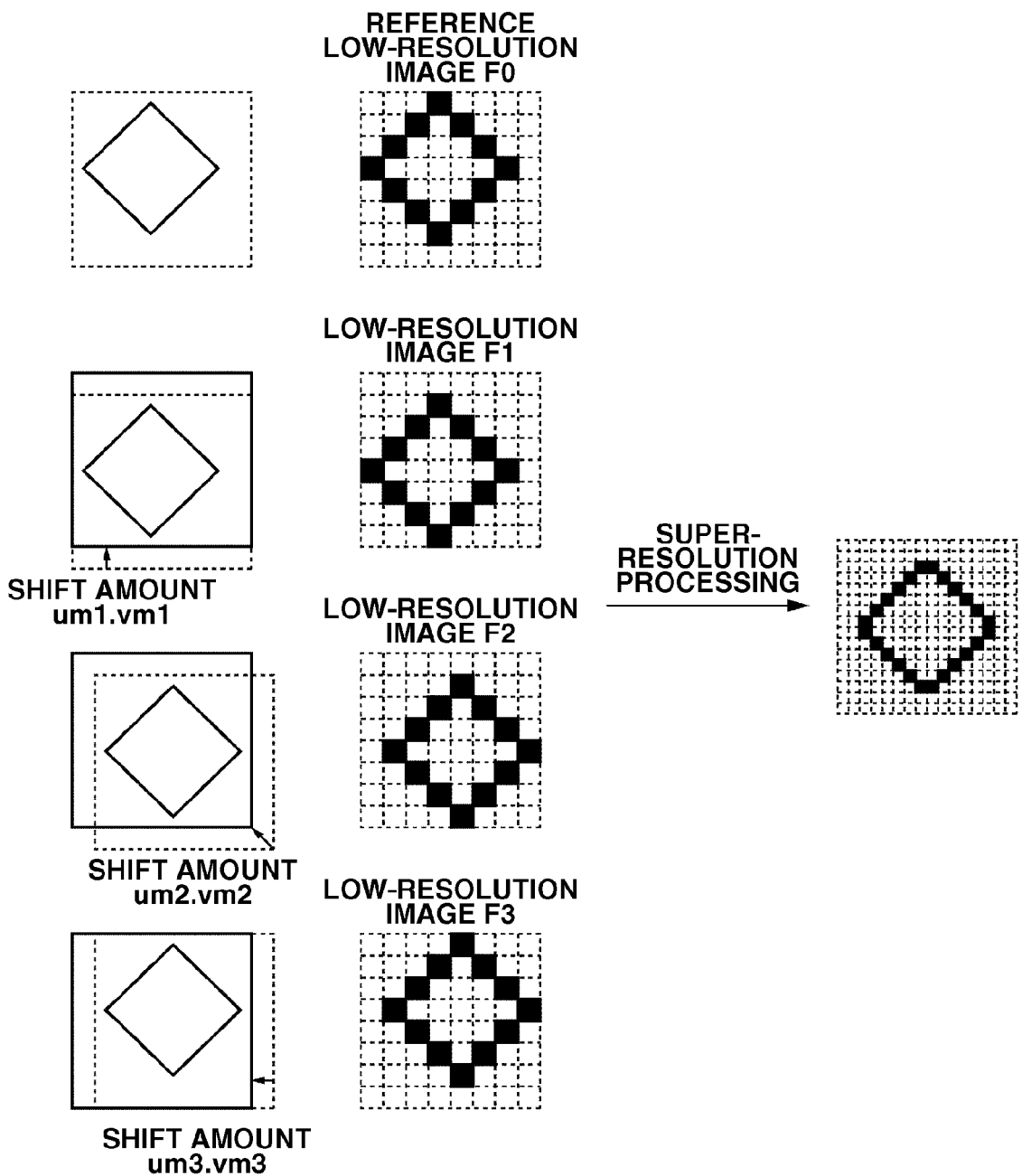
FIG. 19 schematically illustrates the outline of super-resolution processing.
Figure 20:
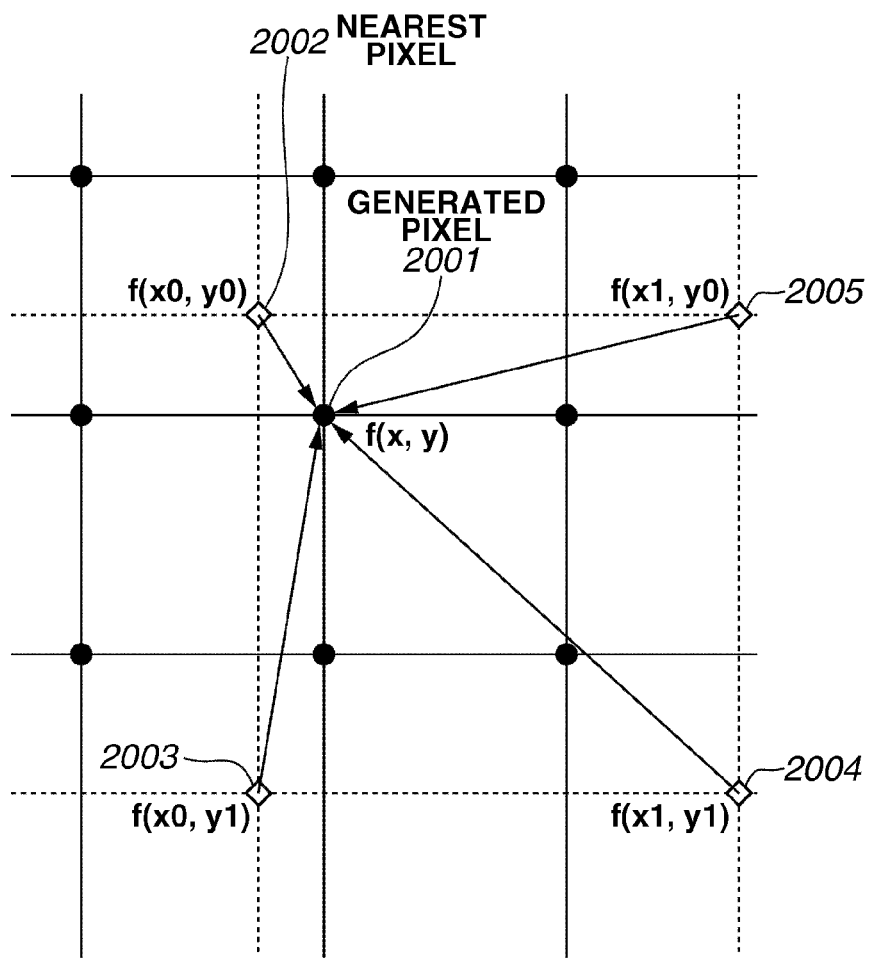
FIG. 20 schematically illustrates the outline of super-resolution processing.

FIG. 19 illustrates a low-resolution image used in super-resolution processing and an image obtained through the super-resolution processing. Specifically, FIG. 19 illustrates an original, a reference low-resolution image F0 that is obtained by reading the original by an area sensor, and target low-resolution images F1 to F3. A broken-line rectangle surrounding the original indicates an area where the reference low-resolution image F0 is read by the area sensor. Solid-line rectangles indicate areas where the target low-resolution images F1 to F3 are read by the area sensor.

In the present exemplary embodiment, a shift amount in the main scanning direction is represented by "um" and a shift amount in the sub-scanning direction is represented by "vm". Those shift amounts in the target low-resolution images Fn (n=1 to 3) are represented by "umn" and "vmn". For example, as illustrated in FIG. 19, the target low-resolution image F1 has a shift in the sub-scanning direction to the reference low-resolution image F0, and the shift amount is represented by um1 and vm1. Likewise, the shift amounts in the target low-resolution images F2 and F3 are represented by um2 and vm2 and um3 and vm3, respectively.

The shift amounts umn and vmn in the respective frames of target low-resolution images Fn (n=1 to 3) are calculated based on the image data of the reference low-resolution image F0 and the image data of the target low-resolution images F1 to F3. The calculation is performed in a predetermined calculating method based on inclination information of the area sensor stored in a read only memory (ROM) 203 in advance.

In the present exemplary embodiment, in FIG. 19, the shifts in the respective frames of target low-resolution images are schematically illustrated in units of pixels for clarity. However, in reading by the area sensor according to the present exemplary embodiment, a phase shift of smaller than one pixel occurs in the main scanning direction and the sub-scanning direction. By using this slight shift, the resolution of an image can be increased as described above.

Therefore, among the respective pixels constituting an image generated through super-resolution processing (hereinafter referred to as "generated pixels"), there exists a pixel that does not exist either in the reference low-resolution image or in the target low-resolution image.

For such a pixel, a predetermined interpolating process is performed by using pixel data indicating pixel values of pixels around the generated pixel to increase resolution while performing synthesis. As the interpolating process, bilinear interpolation, bicubic interpolation, nearest-neighbor interpolation, and the like can be used.

For example, when an interpolating process using the bilinear interpolation is used, first, a nearest pixel 2002 that is the nearest to the position of a generated pixel 2001 is extracted from the reference low-resolution image and the target low-resolution image. Then, from the target low-resolution image in FIG. 20, four pixels surrounding the position of the generated pixel are determined to be surrounding pixels 2002 to 2005. Then, a predetermined weight is added to data values of the surrounding pixels, the data values are averaged, and a data value of the generated pixel is obtained by using the following expression:

$$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$$

By performing the above-described process on the respective generated pixel positions, a super-resolution image having double resolution illustrated in FIG. 19 can be obtained. The resolution factor is not limited to double but various factors may be adopted. The resolution of the super-resolution image is higher as the number of data values of a plurality of frames of low-resolution images used in the interpolating process is larger.

As described above, if the interpolating process is performed using a plurality of frames of image data in which the shift amount of the read positions is smaller than one pixel in the main scanning direction and/or the sub-scanning direction, image data having the resolution higher than the resolution of the reading sensor can be obtained. That is, a high-resolution conversion can be performed using a low-resolution image.

Figure 2:
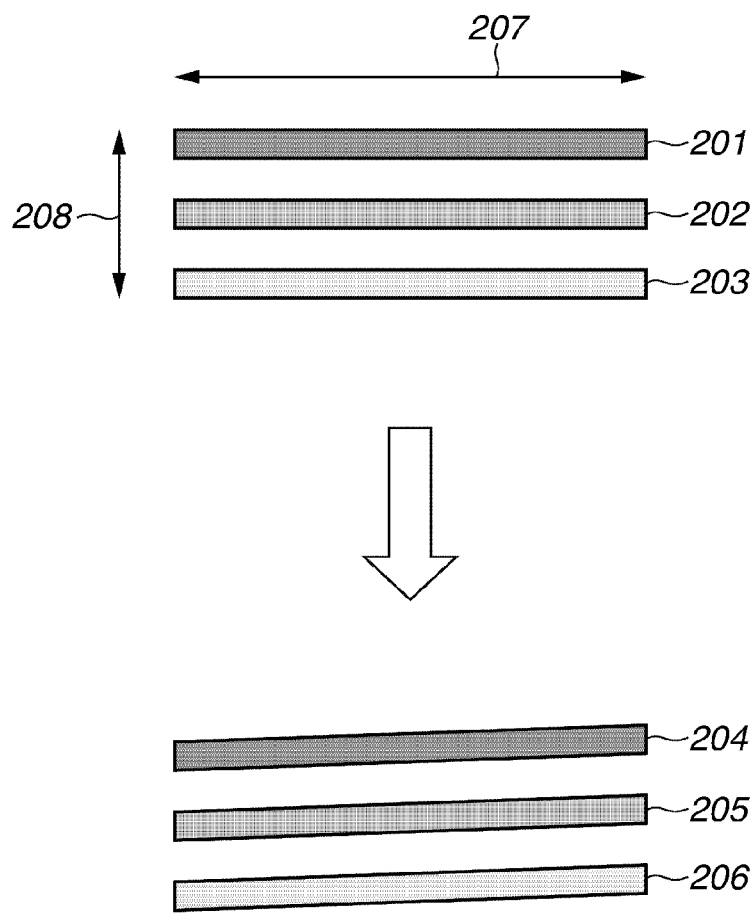
FIG. 2 illustrates linear sensors according to the exemplary embodiment of the present invention.

Next, a process flow according to the present exemplary embodiment will be described. FIG. 2 illustrates a solid-state image sensor in the image reading unit 101 used in the present exemplary embodiment.

A linear sensor 201 has a red color filter, a linear sensor 202 has a green color filter, and a linear sensor 203 has a blue color filter. Data of a main scanning line is obtained from each of the linear sensors. For this reason, the obtained image data has three channels.

Specifically, red image data (hereinafter, referred to as R image data) is obtained from the linear sensor 201, green image data (hereinafter, referred to as G image data) is obtained from the linear sensor 202, and blue image data (hereinafter, referred to as B image data) is obtained from the linear sensor 203. By combining those frames of image data, RGB color image data is obtained.

A long-side direction 207 of the sensors indicates the main scanning direction, whereas a short-side direction 208 of the sensors indicates the sub-scanning direction.

The main scanning direction is a direction vertical to a direction that a light source moves to the original, when the original placed on the original platen is read by the scanner. In addition, a reading direction of an image corresponding to the above direction is called the main scanning direction on the sensor.

Similarly, the sub-scanning direction is a direction that is horizontal to the movement direction of the light source. In addition, a reading direction of an image corresponding to the above direction is called the sub-scanning direction on the sensor.

In an image processing apparatus which performs typical printing, when reflective light of light applied to the original from a light source is collected to a sensor as the image data, the reflective light is taken in without inclination to the sensor.

Thus, the sensors are placed at the position where the image data can be scanned in with almost no inclination.

For example, the main scanning direction in the sensor is almost horizontal to the placement surface of the sensor, and the sub-scanning direction is almost vertical to the displacement surface. At this time, a slight inclination that actually exists is corrected and is compensated for to minimize the inclination. The sensor set position is called a reference set position of the sensors.

In a typical color scanner, the linear sensors 201 to 203 are arranged in the device at the reference set position, such that a major axis is horizontal to the main scanning direction. As illustrated in FIG. 2, the linear sensors 201, 202, and 203 are arranged in parallel with each other at predetermined intervals. Accordingly, position shifts occur among the R image data, G image data, and B image data in the sub-scanning direction. That is, phase shifts occur.

Typically, compensation is performed to correct and reduce the phase shifts in units of pixels by image processing, such as offset correction.

On the other hand, in the present exemplary embodiment, image data is obtained by placing the linear sensors 201 to 203 with inclination to the reference set position, as illustrated by the linear sensors 204 to 206 in FIG. 2.

Figure 3:
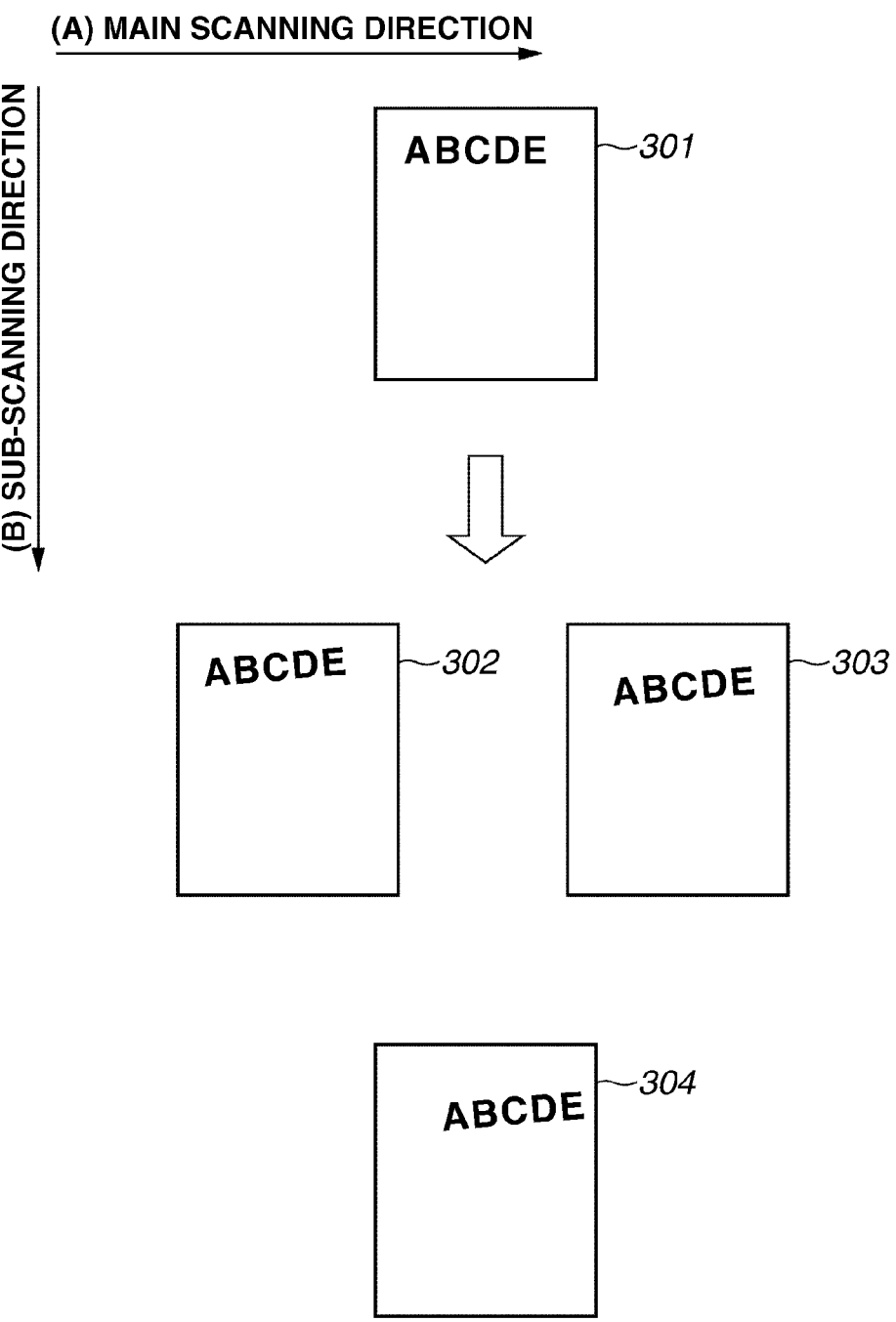
FIG. 3 illustrates image data obtained through scan of an original by inclined linear sensors according to the exemplary embodiment of the present invention.

FIG. 3 illustrates an example where an original is scanned by using the linear sensors 204 to 206. Image data 302 to 304 are scanned through scanning of an original 301. The image data 302 is scanned by the linear sensor 204, the image data 303 is scanned by the linear sensor 205, and the image data 304 is scanned by the linear sensor 206. In addition, as illustrated by an arrow A in FIG. 3, a horizontal direction of the scanned original image is called a "main scanning direction". As illustrated by an arrow B in FIG. 3, a horizontal direction of the scanned original image is called a "sub-scanning direction".

Since the linear sensors are inclined and are placed at intervals in the sub-scanning direction, images having phase shifts in the main scanning direction and the sub-scanning direction in the respective channels can be obtained, like the image data 302 to 304.

In addition, since the linear sensors are placed at intervals, the positions where the adjacent linear sensors read image data are shifted in the sub-scanning direction. That is, image data having phase shifts in the sub-scanning direction can be obtained.

Furthermore, by placing the linear sensors with inclination to the reference set position, the positions where the adjacent linear sensors read an image data are shifted in the main scanning direction and the sub-scanning direction. That is, image data having phase shifts in the main scanning direction and the sub-scanning direction can be obtained.

If the phase shifts in the above-described way are in units of sub-pixels, super-resolution processing can be performed by using the images 302 to 304, so that a high-resolution image can be obtained. Of course, a high-resolution image can be obtained by setting a phase shift only in the main scanning direction or the sub-scanning direction.

Figure 6:
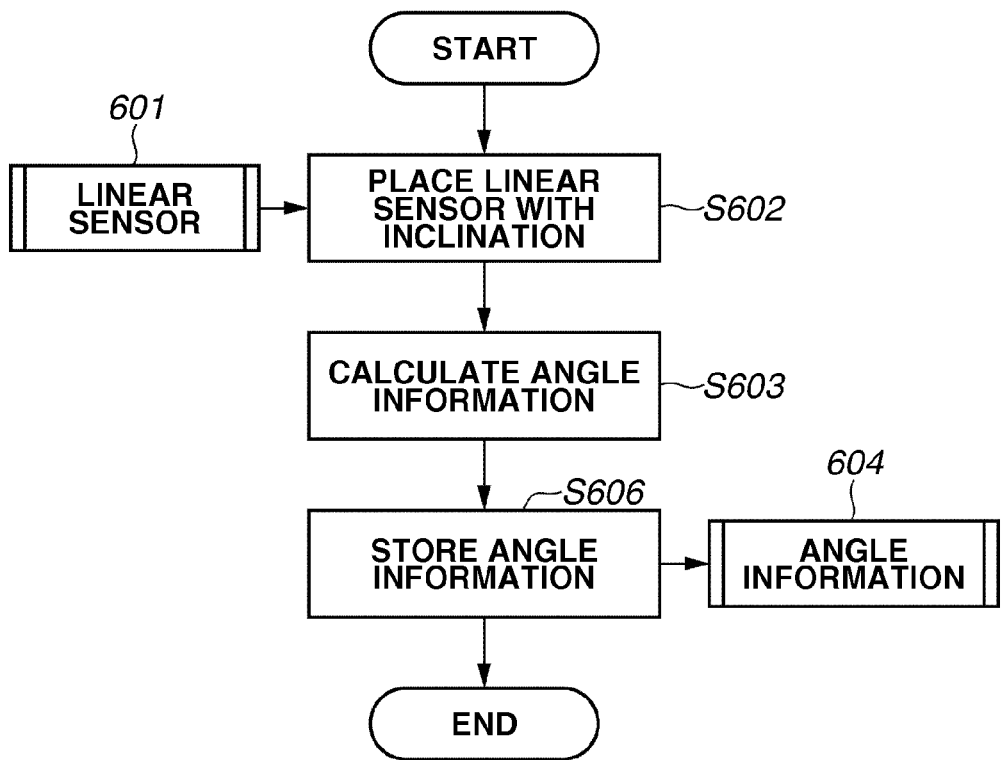
FIG. 6 is a flowchart illustrating a flow of a process for placing the linear sensors with inclination.

FIG. 6 illustrates a process for placing a linear sensor with inclination.

First, a linear sensor 601 is placed with inclination in step S602. This process is performed by a process for assembling the image processing apparatus.

Next, in step S603, the inclination angle of the linear sensor is calculated. Any method may be used to calculate the inclination angle. The calculated inclination angle is stored as angle information 604 in step S605. In this case, however, the read image data may be inclined, as illustrated by the image data 302 to 304 of FIG. 3.

Accordingly, affine transformation is performed by using the angle information 604 of the image data, the inclined image data is rotated to correct the angle, and compensation is made to decrease the inclination.

As a method for correcting the inclined image data, the present invention is not limited to the affine transformation, but any method may be used.

As described above, the phase shifts in units of sub-pixels in the main scanning direction and the sub-scanning direction and the inclination of the image data are corrected, and image data that is compensated for to decrease the inclination can be obtained.

Figure 4:
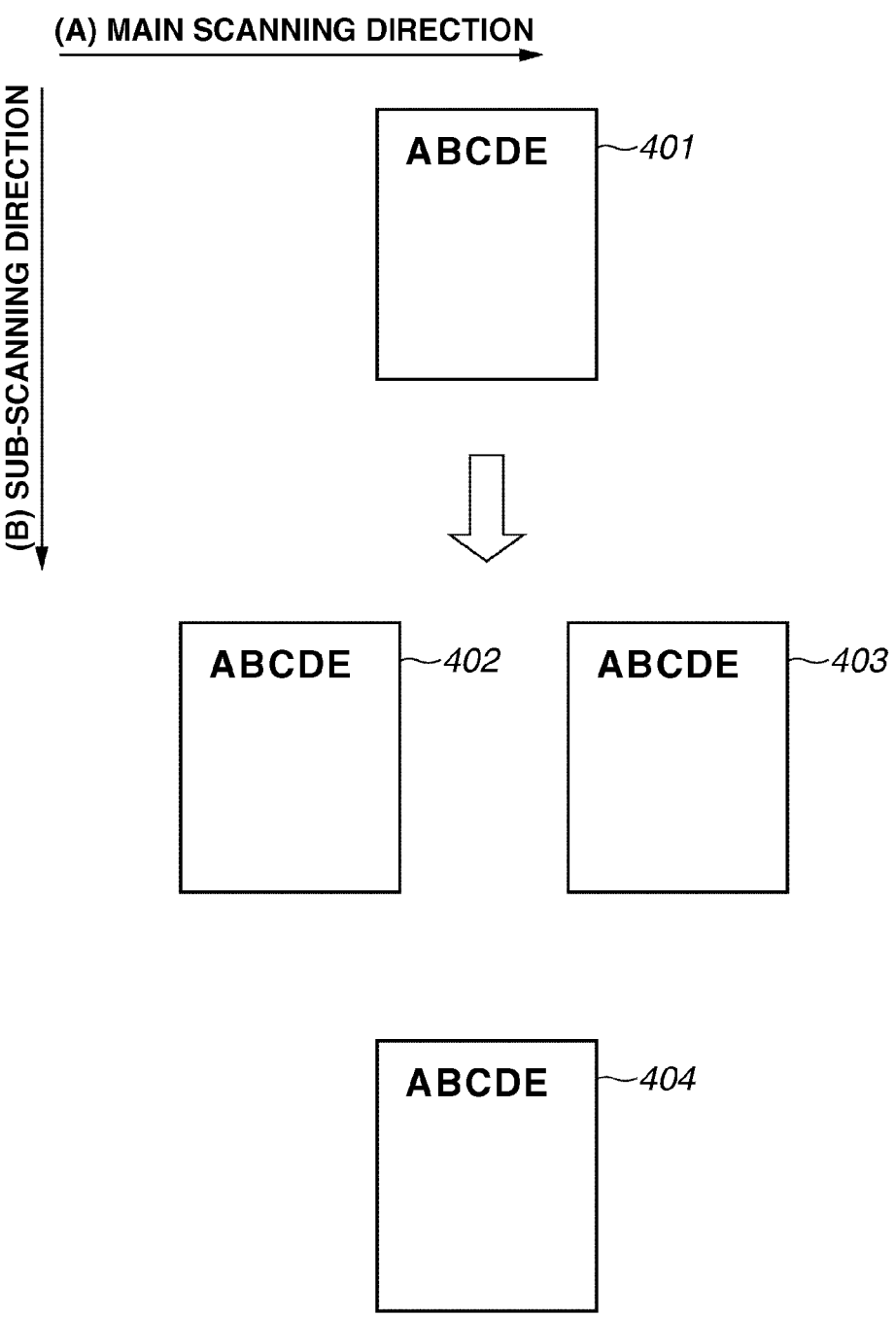
FIG. 4 illustrates an image obtained by performing an affine transformation on the scanned image data.

FIG. 4 illustrates an example where the affine transformation is performed on the image data when being scanned in FIG. 3. In the present exemplary embodiment, the affine transformation is performed on the data 302 to 304 that are obtained by scanning the originals 301 and 401. The images 402, 403, and 404 are obtained by performing the affine transformation on the images 302, 303, and 304, respectively.

Figure 5:
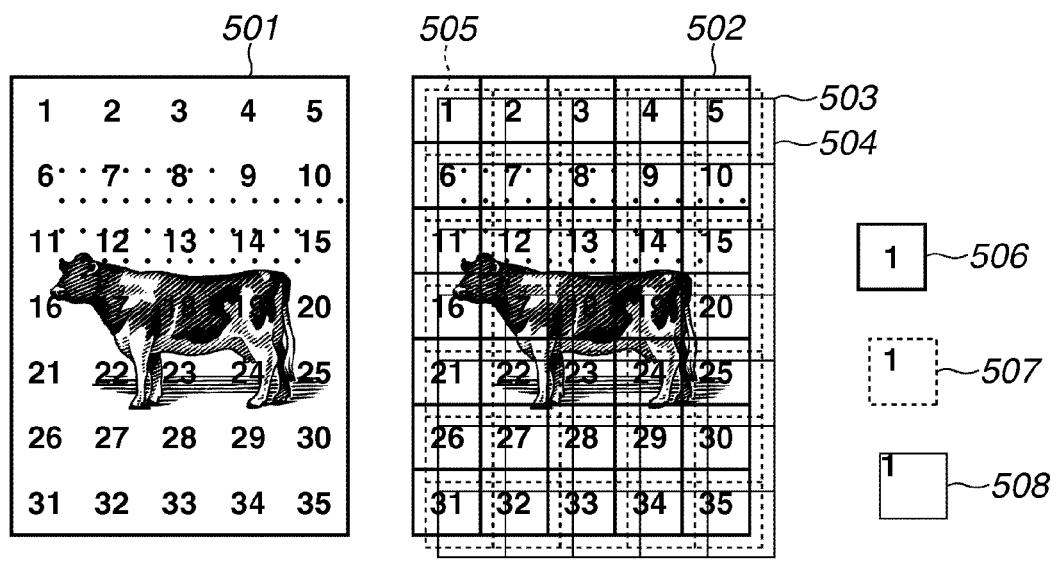
FIG. 5 illustrates an image obtained by dividing the scanned image data into blocks.

FIG. 5 illustrates an image when image data scanned in FIG. 3 is divided into blocks.

An image 502 is obtained by dividing an original image 501 into 35 blocks. At this time, images 503 and 504 have phase shifts of a sub-pixel to the image 502. A block 505 is a first block of the image that is divided into the 35 blocks. In this case, an image 506 is obtained by extracting only the first block 505.

Images 507 and 508 are included in the images 503 and 504 that have phase shifts of a sub-pixel to the first block, respectively.

Figure 7:
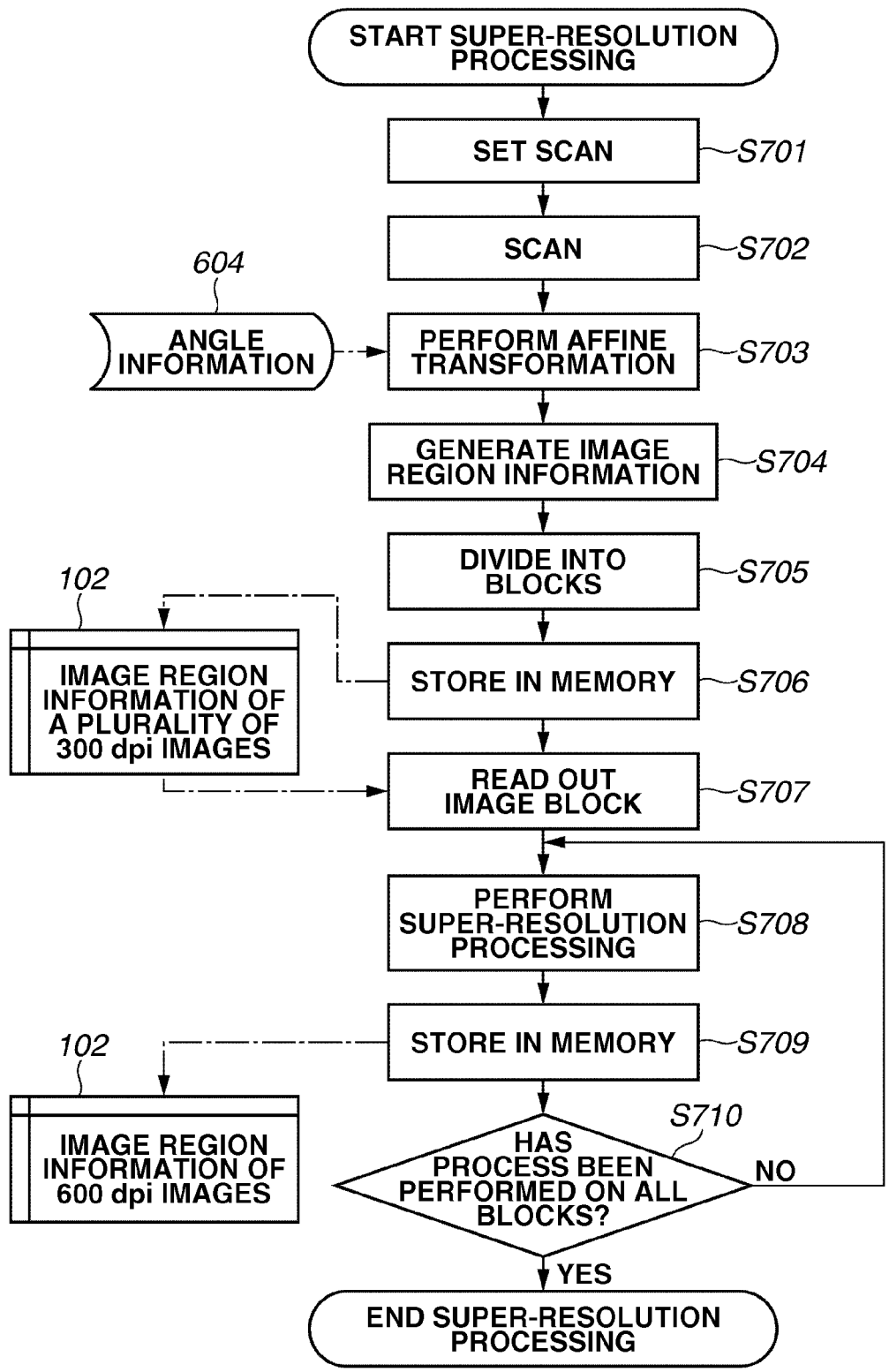
FIG. 7 is a flowchart illustrating an entire flow of super-resolution processing of image data according to the exemplary embodiment of the present invention.

FIG. 7 illustrates a process flow until a high-resolution image is obtained from a plurality of frames of low-resolution images.

Figure 8:
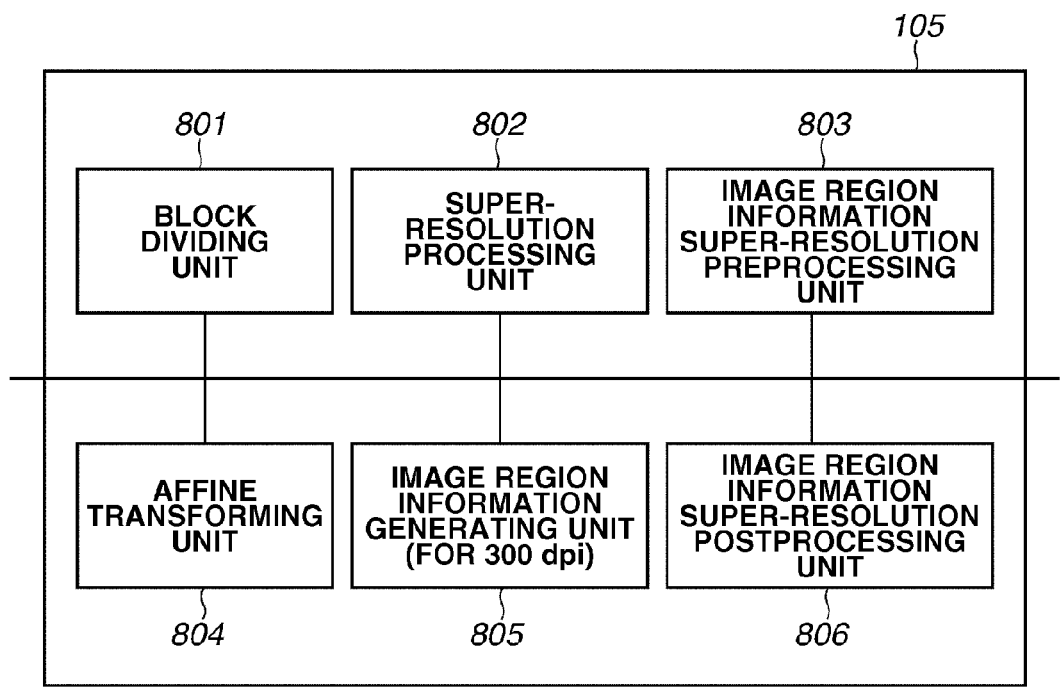
FIG. 8 illustrates a module configuration according to the exemplary embodiment in an inner configuration of a data processing device illustrated in FIG. 1.

FIG. 8 is a detail block diagram illustrating the data processing device 105.

First, based on the block diagrams of FIGS. 8 and 1, FIG. 7 illustrating a flow of a process for increasing the resolution of an image will be descried. The present exemplary embodiment is based on the assumption that an original image is scanned at resolution of 300 dpi and that an image having resolution of 600 dpi is obtained through super-resolution processing. Other than this form, any form may be applied as long as resolution is increased through super-resolution processing.

Further, in the present exemplary embodiment, a plurality of frames of input images having phase shifts are obtained by using the sensors installed to be inclined. However, in addition to the above method, any method may be applied as long as a plurality of frames of image data having a phase shift smaller than one pixel can be obtained.

Hereinafter, steps S702 to 710 are controlled by a central processing unit (CPU) (not illustrated) of the image processing apparatus.

First, various application setting such as resolution and magnification is performed by a user operation on the input device 106 in step S701, and the original is scanned by the image reading unit 101 according to the setting in step S702.

In the present exemplary embodiment, since three images having phase shifts of a sub-pixel are handled, types of image data input by one-time scanning and having a phase shift are three. In the present exemplary embodiment, the number of frames of image data having the phase shifts is three. However, the present exemplary embodiment may be applied, regardless of the number of image data.

The input image data is input to the data processing device 105. At this time, since the sensors of the scanner are installed with the inclination, the images that are input to the data processing device 105 are inclined, like the images 302 to 304. In step S703, first, the image data is transmitted to the affine transforming unit 804, the affine transformation is performed using the angle information 604, and the angle of the inclined image data is corrected.

In step S703, a method for correcting the angle of the inclined image data is not limited to the affine transformation, but any method may be applied. By correcting the angle of the inclined image data, the phase shifts in the main scanning direction and the sub-scanning direction in units of the sub-pixels and the inclination of the image data can be corrected, and a high-resolution image can be obtained.

Next, in step S704, the image data is transmitted to the image region information generating unit 805, and image region information for the plurality of frames of input images having a resolution of 300 dpi is generated.

Figure 9:
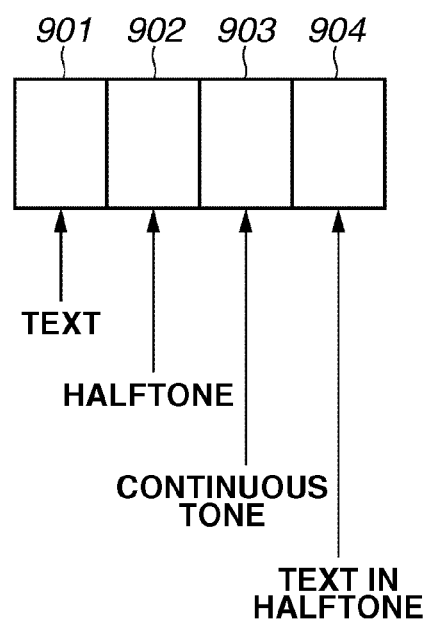
FIG. 9 illustrates a configuration of image region information of one pixel.

The image region information generating unit 805 generates information of a plurality of bits illustrated in FIG. 9, for every pixel. In this case, information of four image regions including a text region 901, a halftone region 902, a continuous tone region 903, and a text-in-halftone region 904, each of which has 1 bit, that is, image region information of 4 bits is generated.

This information is generated to correspond to the number of pixels by one image and is stored in the storage device 102 as image region information associated with the input image data.

Since the image region information is generated to correspond to the number of low-resolution images input from the input device 106, image region information is generated for each of the three images having a resolution of 300 dpi and is stored in the storage device 102.

Next, in step S705, the image data and the generated image region information are transmitted to the block dividing unit 801, and the image data is divided into blocks corresponding to the predetermined number of pixels in vertical and horizontal directions.

This is performed to perform the super-resolution processing at a rear stage in units of blocks and to decrease a memory capacity needed in the super-resolution processing. Of course, the super-resolution processing may be performed on one frame of image data without the block division.

In step S706, the image region information and the image data divided in units of blocks are stored in the storage device 102.

Among the storage data, the same block data as the plurality of frames of obtained image data is read in step S707, and subjected to the super-resolution processing by the super-resolution processing unit 802 in step S708.

The block image having a resolution of 600 dpi by the super-resolution processing is stored in the memory again in step S709, and a series of super-resolution processing is performed on all of the blocks in step S710.

The configuration of the super-resolution processing unit 802 may be diversified according to a use object, in addition to the configuration to perform the above-described super-resolution processing.

For example, by limiting an input image that can be subjected to the super-resolution processing to 8 bit/component, the super-resolution processing unit can be configured with the circuit scale smaller than that in the case of corresponding to another input image.

The image data having a resolution of 600 dpi with the above-described process flow is subjected to image processing, based on image region information corresponding to an image that has a resolution of 600 dpi and is generated by a method to be described in detail below. The image processing is performed by a module (not illustrated) in the data processing device 105, and gamma processing, color space conversion processing, filter processing, or halftone processing is selectively performed for every image region.

Then, the data obtained through the image processing is transmitted to the recording device 103, and the image data is output.

Figure 10:
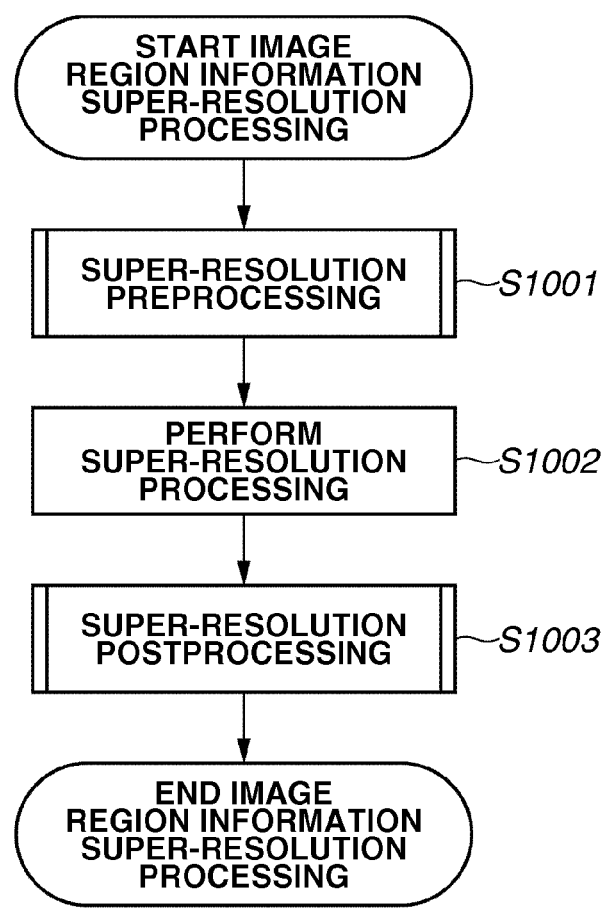
FIG. 10 is a flowchart illustrating an entire flow of super-resolution processing of image region information according to the exemplary embodiment of the present invention.

FIG. 10 illustrates a process flow until image region information corresponding to a high-resolution image is obtained from image region information corresponding to a plurality of frames of low-resolution images.

The process flow is controlled by the CPU (not illustrated) of the image processing apparatus.

In order to generate image region information corresponding to an image having a resolution of 600 dpi from image region information corresponding to a plurality of frames of images having a resolution of 300 dpi, the image region information is processed through three steps using super-resolution preprocessing S1001, super-resolution processing S1002, and super-resolution postprocessing S1003.

The individual processing is performed in the image region information super-resolution preprocessing unit 803, the super-resolution processing unit 802, and the image region information super-resolution postprocessing unit 806, which are illustrated in FIG. 8.

Figure 11:
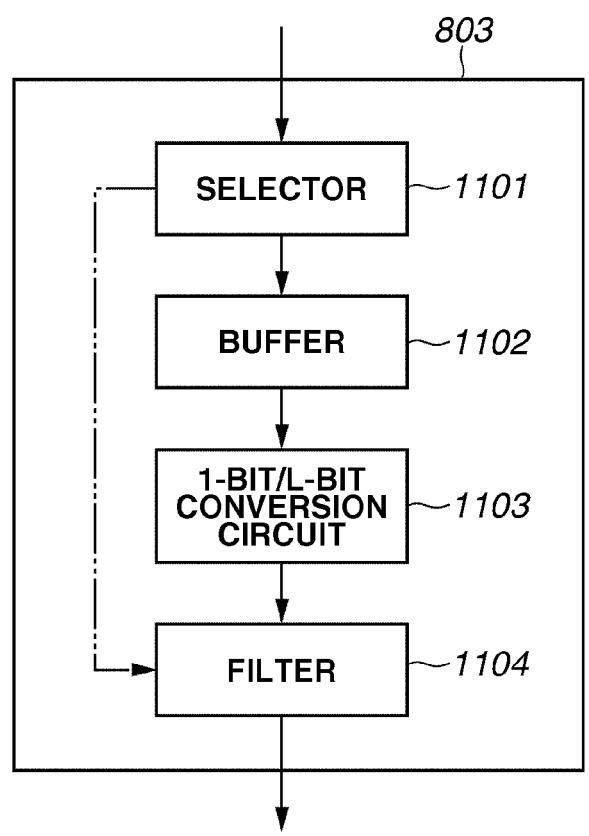
FIG. 11 is a detailed block diagram illustrating an image region information super-resolution preprocessing unit illustrated in FIG. 8.

The process contents of the super-resolution preprocessing 1001 will be described according to the block diagram of FIG. 8, the detailed block diagram of the image region information super-resolution preprocessing unit 803 illustrated in FIG. 11, and the super-resolution preprocessing flow illustrated in FIG. 12.

First, in step S1201, among the image region information that corresponds to the image data read with the resolution of 300 dpi from the storage device 102, data of one target block is transmitted to the image region information super-resolution preprocessing unit 803.

For example, when one block includes 32×32 pixels, as illustrated in FIG. 9, the image region information data has 4 bits by one pixel. Accordingly, data of 4 kbits (512 bytes) is sequentially read.

The read data is sequentially input to an internal selector 1101 in a unit of 4 bits. In this case, the image region information of the predetermined 1 bit is extracted from the image region information of 4 bits in step S1202, and the extracted 1 bit as a target bit is stored in a buffer 1102 at a rear stage in step S1203. This process is repeated by the number of pixels in the target block in step S1204.

Next, in step S1205, the image region information super-resolution preprocessing unit 803 reads out data corresponding to the surrounding pixels of the target block among the image region information corresponding to the image having a resolution of 300 dpi, from the storage device 102.

Figure 13:
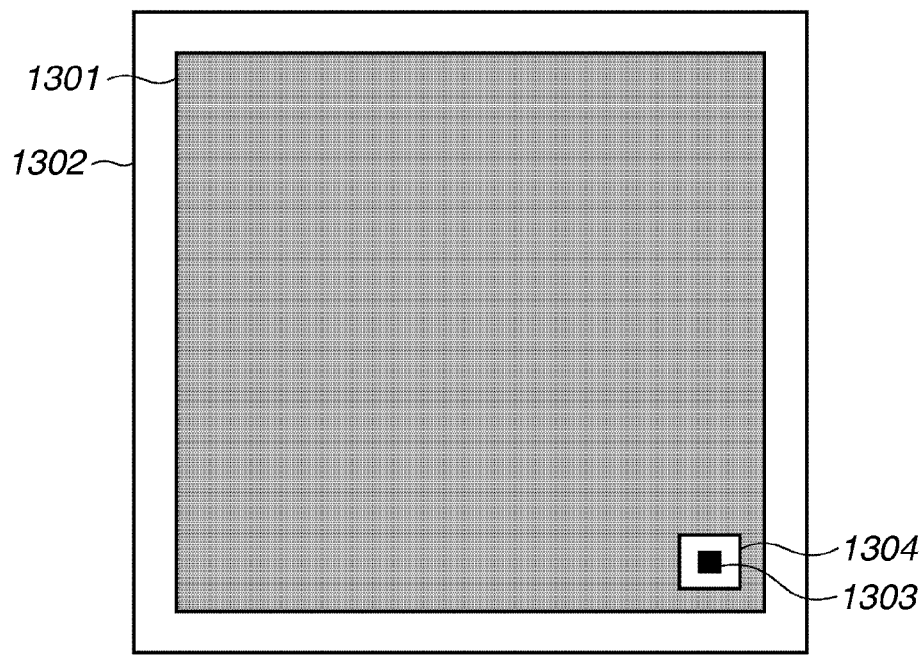
FIG. 13 illustrates a relationship of a target block, surrounding pixels of the target block, a target pixel, and a surrounding small block of the target pixel, to a region divided into a block unit.

FIG. 13 illustrates a positional relationship between the target block and the surrounding pixels. An internal gray portion 1301 represents a target block, and an outer circumferential white portion 1302 represents surrounding pixels. The number of outer circumferential lines of the read surrounding pixels depends on an area process size of a filtering process unit at a rear stage.

In the case of 3×3 filters, image region information for the surrounding pixels that correspond to the number of outer circumferential lines of two lines is read.

For the image region information, similar to the process in the target block, a target bit is extracted by the selector 1101 in step S1206 and is stored in the buffer 1102 in step S1207. This process is repeated by the number of pixels in a surrounding image region of the target block in step S1208.

Next, one pixel in the target block 1301 is selected and is assumed to be a target pixel 1303. In a small block including surrounding pixels 1304 of the target pixel, image region bits as bits constituting the image region information is selected by one bit. The selected image region bit is sequentially read out from the buffer 1102 and is input to a 1-bit/L-bit conversion circuit 1103, and a converting process is performed on the image region bit in step S1209.

In this case, "0/1 input data" of 1 bit is converted into "ALL0/ALL1 data" of L bits and is then output.

In this case, L can be the same number as a bit width of 1 component of image data input to the super-resolution processing unit, when the super-resolution processing is performed on the image data in advance.

In the present exemplary embodiment, since the image data is set as RGB data having 8 bits, L of the 1-bit/L-bit conversion circuit is set to 8, an input "0b0" is converted into "0x00", an input "0b1" is converted into "0xFF", and the image data is output.

As such, in step S1210, filter processing is performed on an image region bit in a small block extended to 8 bits, by a filter 1104 at a rear stage.

In this case, an example of a process of 3×3 filters will be described. The small block includes 3×3 pixels centering on the target pixel 1303.

The data, which is included in the small block and in which a target bit of image region data is extended to a bit width of 8 bits, is input to the filter 1104.

In the filter 1104, any kinds of coefficient tables are held. Each table is switched according to an image region bit selected by the selector 1101, and filter processing is performed.

In this case, a process for increasing the resolution of each image region bit is mainly performed.

For example, in the surrounding pixel, an image region bit considered as an erroneous determination is corrected, when an image region bit of the target pixel does not rise even though the image region bit representing a text region rises.

As such, 8-bit data subjected to the filter processing is stored in the storage device 102 in step S1211, and this process is performed on all of the pixels in the target block in step S1212.

By using the processes described above, the super-resolution preprocessing can be performed for the image region data corresponding to the target block where one frame of image having a resolution of 300 dpi exists.

That is, the target bit is extracted from the image region data corresponding to the target block and is converted into a format that can be input to the super-resolution processing unit in a proper form, thereby performing an image region information conversion.

This process is performed for the image region information obtained from the data corresponding to the number of frames needed during the super-resolution processing, that is, all of the image data having a resolution of 300 dpi in step S1213.

By the processes described above, data of 8-bit output data×32 pixels×32 pixels=8192 bits=1 Kbytes is obtained by the number of frames of image data having a resolution of 300 dpi.

In step S1002, if the data is input to the super-resolution processing unit 802 and is processed, this case becomes equal to the case where the RGB image having 8 bits and a resolution of 300 dpi is input to the super-resolution processing unit 802 and is processed, and the super-resolution processing can be performed on the image region information.

As a result, the super-resolution processing is performed for the specific image region bit of the specific block region, and data of 8 bits×64 pixels×64 pixels=4 kbytes/1 block·1 zbit (zbit is assumed to be an image region bit) is obtained.

If the processes of steps S1001 and S1002 descried above are performed on 4 bits of all of the image region bits, the processes are performed on all of the block regions.

That is, an image region information high-resolution conversion is performed on all of the converted image region information, using the same method as the method that is used when the image data is converted to have a high resolution.

That is, the image region information is converted to have a high resolution is performed using the same circuit as the circuit that is used when the image data is converted to have a high resolution.

In addition, the procedure proceeds to step S1003, in which super-resolution postprocessing is performed.

Figure 14:
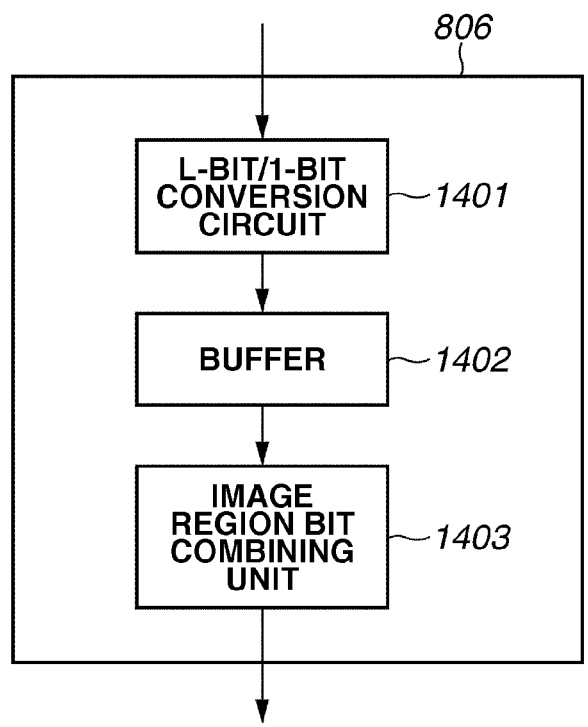
FIG. 14 is a detailed block diagram illustrating an image region information super-resolution postprocessing unit illustrated in FIG. 8.

The process contents of the super-resolution postprocessing 103 will be described according to the block diagram of FIG. 8, the detailed block diagram of the image region information super-resolution postprocessing unit 806 illustrated in FIG. 14, and the super-resolution postprocessing flow illustrated in FIG. 15. This process flow is controlled by the CPU (not illustrated) of the image processing apparatus.

First, among the image region information obtained through the super-resolution processing that is stored in the storage device 102 from the super-resolution processing unit 802, data corresponding to one target block and one image region bit is transmitted to the image region information super-resolution preprocessing unit 803 in step S1501.

In this case, the input data is 8 bits per pixel. The input data is input to an L-bit/1-bit conversion circuit 1401 at a next stage, and a bit reducing process is performed on the data in step S1502.

In the L-bit/1-bit conversion circuit 1401, any threshold value can be set in advance, and the set threshold value can be changed based on a property of the read image region bit.

In addition, according to the threshold value, input data having 8 bits is converted in units of bits and are stored in a buffer 1402 at a next stage.

The processes described above are first performed for one block, that is, 64×64 pixels.

Next, the processes described above are performed on all of the information bits in step S1504.

In the present exemplary embodiment, the information bits are 4 bits. Accordingly, the processes of steps S1501 to S1504 are performed on each information bit, and the data is stored in the buffer.

In addition, the information bits that are converted into units of bits and stored in the buffer and are subjected to the super-resolution processing to be used for the image having a resolution of 600 dpi are input to an image region bit combining unit 1403, the format of the information bits is returned to the format of the image region information of 4 bits illustrated in FIG. 9, and the information bits are stored in the storage device 102 in step S1505.

The processes described above are performed on the image region information for all of the blocks constituting the image having a resolution of 600 dpi, and image region information regeneration corresponding to the final image having a resolution of 600 dpi is performed.

The image region information that is converted to correspond to the image having a resolution of 600 dpi according to the above process flow is rasterized together with the image data having a resolution of 600 dpi, in a block rasterization processing unit (not illustrated) in the data processing device 105.

In addition, as described above, image processing, such as gamma processing, color space conversion processing, filter processing, and halftone processing, are selectively performed on the image data, for every corresponding image region.

Then, data obtained through the image processing is transmitted to the recording device 103.

By the above configuration, by using the same circuit as the circuit used when the image data is converted to have a high resolution without additionally providing a high resolution image region information generation circuit, image region information corresponding to a high-resolution image subjected to the super-resolution processing can be generated from image region information of a plurality of frames of low-resolution images.

As a result, the scale of the circuit configuration to generate image region information can be suppressed from increasing.

In the above-described exemplary embodiment, from the image region information obtained by the existing image region information generating unit for the low-resolution image that has the small circuit scale, image region information for the high-resolution image is generated.

On the other hand, information that is different from the color information obtained by the scanner and is obtained by a special scanner cannot be generated from the image data obtained as the image region information.

In the present exemplary embodiment, the special scanner refers to a scanner that can detect glossiness of an image having glossiness by a transparent toner and the like.

Specifically, as described above, when an image having a transparent toner applied thereto is read by a reading device such as a scanner, information of glossiness by the transparent toner can be obtained only when the image is read by the scanner.

Accordingly, the glossiness information cannot be obtained from the image data that has been once converted to have a high resolution.

However, if glossiness information of a plurality of frames of low-resolution images can be obtained from the special scanner for the low-resolution image according to the present exemplary embodiment, it is possible to generate glossiness information corresponding to the image data converted to have a high resolution by the same method as that in the above-described exemplary embodiment.

Similarly, it is possible to generate image region information corresponding to an image converted to have a high resolution. The image region information can be obtained only when the image is read by the scanner.

The image region information that is represented by the glossiness information and can be obtained only when the image is read by the scanner is hereinafter called "special toner information".

When the image reading unit 101 can obtain the special toner information, the image data and the special toner information of 1 bit per one pixel are transmitted from the image reading unit 101.

On the special toner information, an affine transformation is performed independently from the image data. Further, the special toner information is stored in the storage device 102 independently from the image data or the image region information generated from the image data.

In addition, in the image region information super-resolution preprocessing unit 803 and the super-resolution processing unit 802, the same processes as the super-resolution preprocessing S1001 and the super-resolution processing 1002 on the image region information are performed on the special toner information.

Figure 12:
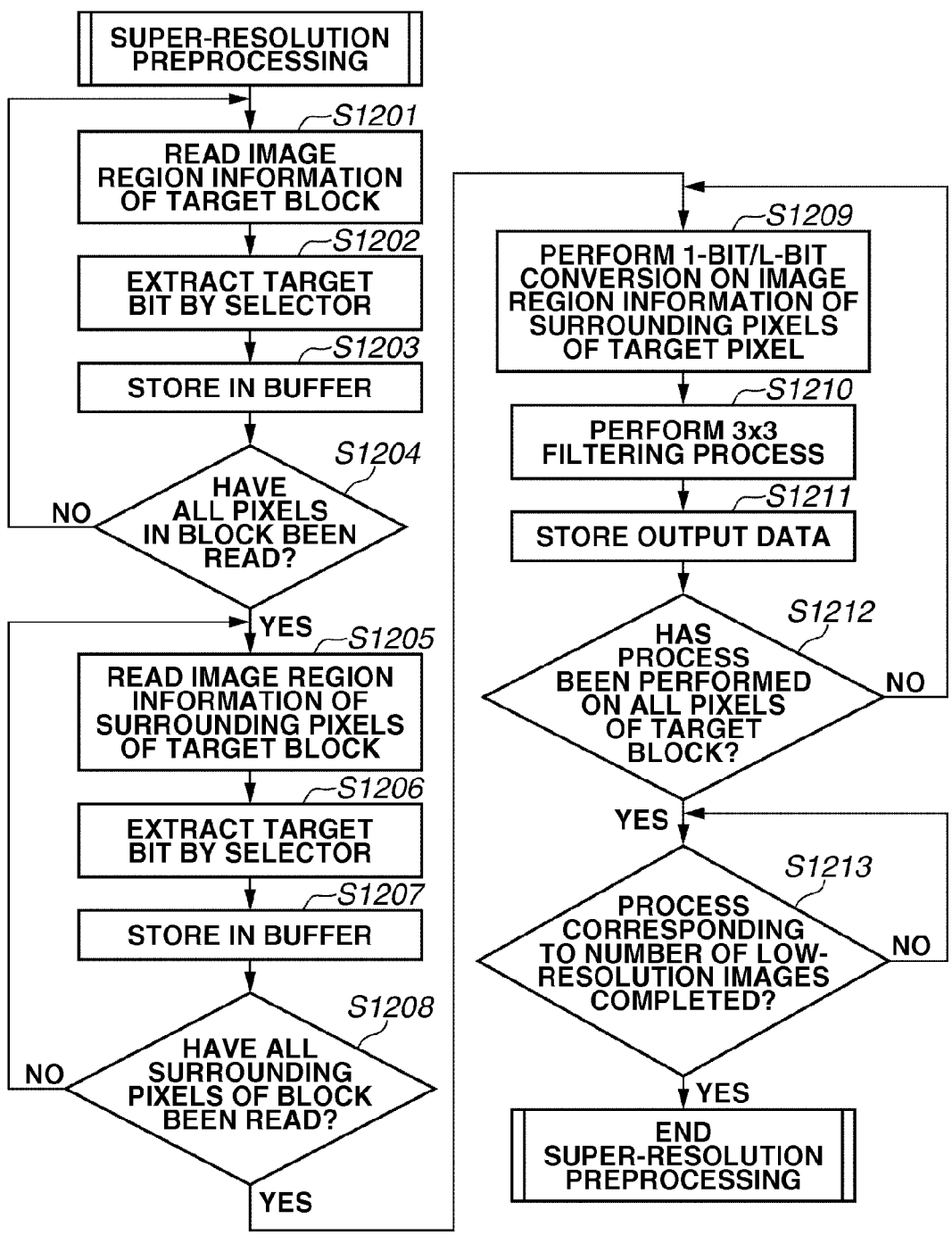
FIG. 12 is a flowchart illustrating a detailed process flow of super-resolution preprocessing illustrated in FIG. 10.

That is, the special toner information is converted according to the process flow illustrated in FIG. 12 and the format of the special toner information is converted. In addition, the special toner information whose format has been converted is converted to have a high resolution, using a special toner information high-resolution conversion.

Figure 15:
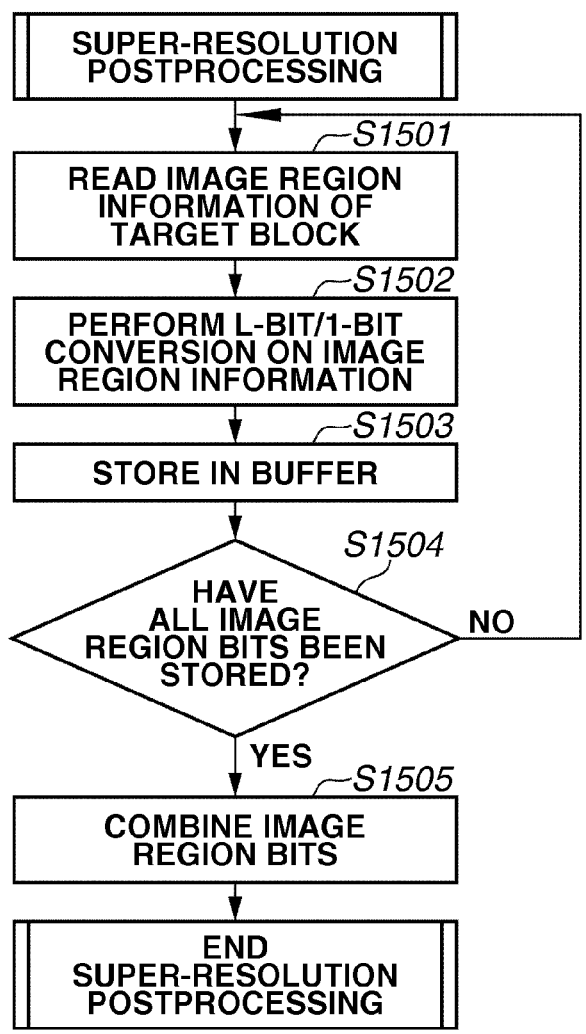
FIG. 15 is a flowchart illustrating a detailed process flow of super-resolution postprocessing illustrated in FIG. 10.

Further, special toner information regeneration is performed on the special toner information converted to have a high resolution according to the process flow illustrated in FIG. 15, and special toner information that has the same resolution as that of the image data converted to have a high resolution is generated.

As such, the special toner information corresponding to the image converted to have a high resolution can be generated.

Further, while a series of processes are performed on the special toner information or when super-resolution postprocessing at a final stage is performed on the special toner information, the special toner information may be reassigned as 1 bit of the image region information.

With the above-described configuration, in regards to the information other than the color information, such as the glossiness information, which is obtained by using the special scanner, the image region information of the image data obtained through the super-resolution processing can be generated from information of a plurality of frames of low-resolution images.

Accordingly, when the image region information is used and the image processing is performed on the image data obtained through the super-resolution processing, the image processing can be accurately performed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-242568 filed Sep. 22, 2008, which is hereby incorporated by reference herein in its entirety.

What is claimed is:

1. An image processing apparatus including a reading sensor configured to read an original image, the image processing apparatus comprising:
    an image data acquiring unit configured to acquire image data of a plurality of frames of images in which positions read by the reading sensor are shifted by less than one pixel in a main scanning direction and/or a sub-scanning direction;
    a high-resolution converting unit configured to perform interpolation by using the plurality of frames of image data acquired by the image data acquiring unit to obtain image data having resolution higher than resolution of the reading sensor;
    an image region information generating unit configured to generate image region information including image region bits from the image data acquired by the reading sensor;
    an image region information converting unit configured to convert the image region information generated by the image region information generating unit into a format capable of being input to the high-resolution converting unit;
    an image region information high-resolution converting unit configured to perform a high-resolution conversion on the image region information whose format has been converted by the image region information converting unit, by using the high-resolution converting unit; and
    an image region information regenerating unit configured to regenerate the image region information, which has been converted to have the high resolution by the image region information high-resolution converting unit, as image region information having the same resolution as that of the image data converted to have the high resolution by the high-resolution converting unit,
    wherein the image region information converting unit selects one image region bit from the image region bits constituting the image region information, and converts the selected image region bit to have the same bit width as that of color information of the image data,
    wherein image region information that includes the image region bit whose bit width has been converted is converted to have the high resolution by the image region information high-resolution converting unit, and
    wherein the image region information regenerating unit reduces the number of image region bits constituting the image region information converted to have the high resolution to 1 bit by a predetermined threshold value and allocates the image region information where the number of bits has been reduced to the image region bit selected by the image region information converting unit, to regenerate the image region information as the image region information having the same resolution as that of the image data whose resolution has been converted by the high-resolution converting unit.

2. The image processing apparatus according to claim 1, wherein the image region information converting unit performs filter processing selected according to a feature of the selected image region bit, after the bit width is converted.

3. A method for controlling an image processing apparatus including a reading sensor configured to read an original image, the method comprising:
    acquiring image data of a plurality of frames of images in which positions read by the reading sensor are shifted by less than one pixel in a main scanning direction and/or a sub-scanning direction;

performing interpolation by using the plurality of frames of acquired image data, inputting the image data to a high-resolution converting unit configured to obtain image data having resolution higher than resolution of the reading sensor, and performing a high-resolution conversion on the image data;

generating image region information including image region bits from the image data acquired by the reading sensor;

converting the generated image region information into a format capable of being input to the high-resolution converting unit;

performing a high-resolution conversion on the image region information whose format has been converted, by using the high-resolution converting unit;

regenerating the image region information, which has been converted to have the high resolution, as image region information having the same resolution as that of the image data converted to have the high resolution;

selecting one image region bit from the image region bits constituting the image region information, and converting the selected image region bit to have the same bit width as a bit width of color information of the image data;

performing a high-resolution conversion on image region information that includes the image region bit whose bit width has been converted; and reducing the number of image region bits constituting the image region information converted to have the high resolution to 1 bit by a predetermined threshold value and allocating the image region information where the number of bits has been reduced to the selected image region bit, to regenerate the image region information as the image region information having the same resolution as that of the image data whose resolution has been converted.

4. The method according to claim 3, further comprising:

performing filter processing selected according to a feature of the selected image region bit, after the bit width is converted.

5. A non-transitory computer-readable storage medium storing a program for causing a computer to execute a method for controlling an image processing apparatus including a reading sensor configured to read an original image, the method comprising:

acquiring image data of a plurality of frames of images in which positions read by the reading sensor are shifted by less than one pixel in a main scanning direction and/or a sub-scanning direction;

performing interpolation by using the plurality of frames of acquired image data, inputting the image data to a high-resolution converting unit configured to obtain image data having resolution higher than resolution of the reading sensor, and performing a high-resolution conversion on the image data;

generating image region information including image region bits from the image data acquired by the reading sensor;

converting the generated image region information into a format capable of being input to the high-resolution converting unit;

performing a high-resolution conversion on the image region information whose format has been converted, by using the high-resolution converting unit;

regenerating the image region information, which has been converted to have the high resolution, as image region information having the same resolution as that of the image data converted to have the high resolution;

selecting one image region bit from the image region bits constituting the image region information, and converting the selected image region bit to have the same bit width as a bit width of color information of the image data;

performing a high-resolution conversion on image region information that includes the image region bit whose bit width has been converted; and reducing the number of image region bits constituting the image region information converted to have the high resolution to 1 bit by a predetermined threshold value and allocating the image region information where the number of bits has been reduced to the selected image region bit, to regenerate the image region information as the image region information having the same resolution as that of the image data whose resolution has been converted.

* * * * *